United States Patent [19]

Lynch

[11] Patent Number: 5,752,687
[45] Date of Patent: May 19, 1998

[54] CUP HOLDER WITH LID RETAINER

[76] Inventor: Michelle Lynch, 3541 17th St., San Francisco, Calif. 94110

[21] Appl. No.: 904,200

[22] Filed: Jul. 31, 1997

Related U.S. Application Data

[63] Continuation of Ser. No. 574,251, Dec. 18, 1995, abandoned.

[51] Int. Cl.⁶ .................................................... A47K 1/08
[52] U.S. Cl. .................. 248/311.2; 224/440; 220/737; 215/390
[58] Field of Search ................... 248/311.2; 280/288.4; 224/440, 425, 455, 458, 547, 565; 220/737, 738, 740; 215/390

[56] References Cited

U.S. PATENT DOCUMENTS

| | | | |
|---|---|---|---|
| D. 317,146 | 5/1991 | Runkel | D12/158 |
| 3,905,511 | 9/1975 | Groendal | 220/740 X |
| 4,071,175 | 1/1978 | Wagnon | 224/36 |
| 4,312,465 | 1/1982 | Sinkhorn et al. | 220/440 X |
| 4,570,835 | 2/1986 | Criqui et al. | 224/36 |
| 4,838,466 | 6/1989 | Holmstrom | 220/737 X |
| 4,927,047 | 5/1990 | Stuber | 220/740 X |
| 4,948,080 | 8/1990 | Jack | 248/311.2 |
| 5,040,710 | 8/1991 | Lee | 224/425 X |
| 5,215,231 | 6/1993 | Paczonay | 222/610 |
| 5,261,554 | 11/1993 | Forbes | 220/740 X |

Primary Examiner—Ramon O. Ramirez
Assistant Examiner—Kimberly T. Wood
Attorney, Agent, or Firm—Jack Lo

[57] ABSTRACT

A cup holder includes a ring-shaped supporting member, a cord with a proximal end fixedly attached to the supporting member, a hook attached to the distal end of the cord, and a pair of upper and lower anchoring pins attached to the supporting member at a position opposite the proximal end of the cord. A lid retainer is attached to the cord between the ends. A conventional mounting device attached to the supporting member attaches the cup holder to a vehicle, such as on the handlebar of a bicycle. A disposable cup, such as those typically used for holding hot coffee to go, may be held in the cup holder by placing it in the supporting member, positioning the lid retainer on top of the lid, and engaging the hook on one of pins, which is selected to keep the cord in tension. Thus the lid is secured on the cup to prevent spills even when the liquid is sloshed around inside the cup, such as during a bicycle ride.

2 Claims, 1 Drawing Sheet

CUP HOLDER WITH LID RETAINER

This application is a continuation of prior application Ser. No. 08/574,251, filed on Dec. 18, 1995, now abandoned.

BACKGROUND OF THE INVENTION

1. Field of the Invention

This invention relates generally to cup holders, specifically to a cup holder with a lid retainer for holding a cup and securing its lid.

2. Prior Art

A beverage sold for takeout is typically provided in a disposable paper or plastic cup with a snap-on lid. However, a typical lid is so flimsy that it will be forced off by the sloshing liquid if the cup is shaken moderately, so that the drink will spill out. The spill will at least be wasteful and make a mess, but if the liquid is hot, it may even injure a nearby person.

Cup holders for holding beverage cups in vehicles, such as cars and bicycles, are well known. Some are built-in, and some are sold in the after-market for retrofitting to a vehicle. U.S. Pat. Nos. 4,948,080 to Jack (1990); 4,570,835 to Criqui et al. (1986); and 4,071,175 to Wagnon (1978) show similar cup holders, each of which has a receptacle attachable to a bicycle for holding a cup or can. However, they include no provision for securing the lid of a cup, so that if the bicycle bounces moderately, the sloshing beverage may force off the lid and spill out.

U.S. Pat. No. 5,215,231 to Paczonay (1993) shows a water supply apparatus that includes an inverted drinking bottle held in a mounting bracket attached to the frame of a bicycle. A long tubing extends from the bottom of the bracket to supply fluid to a rider. The Paczonay device is completely unsuitable for holding a cup. U.S. patent Des. 317,146 to Runkel (1991) shows a triangular drink holder adapted to wrap around a corner formed by two tubular members of a bicycle frame. It is presumably made of fabric, and is usable as a pocket for holding a sealed drink bottle or can. However, it is unsuitable for holding a disposable cup, because it is not shaped for securely holding one without distorting it and causing it to spill.

OBJECTS OF THE INVENTION

Accordingly the primary object of the present invention is to provide a cup holder for securely holding a disposable cup on a vehicle.

Another object of the present invention is to provide a cup holder that secures the lid on the cup to prevent spills even during a rough ride.

Yet another object of the present invention is to provide a cup holder that is easily attachable to a vehicle.

Still another object of the present invention is to provide a cup holder that is easily removable from the vehicle when not in use.

Further objects of the present invention will become apparent from a consideration of the drawings and ensuing description.

SUMMARY OF THE INVENTION

A cup holder includes a ring-shaped supporting member with a mounting bracket for mounting onto the handlebar of a bicycle. The proximal end of an elastic cord is fixedly attached to the supporting member. A hook on the free end of the cord allows it to be secured to a pin positioned across an opening of the supporting member. A lid retainer is slidably attached to the cord. When a cup of beverage is seated in the opening of the supporting member, the cord is draped across the lid of the cup so that the lid retainer is positioned thereon. The free end of the cord is then hooked onto the pin to secure the lid, so as to ensure that it will not come off even during a rough ride.

DRAWING REFERENCE NUMERALS

| | |
|---|---|
| 10. Supporting Member | 11. Vertical Member |
| 12. Vertical Member | 13. Bracket Portion |
| 14. Mounting Device | 15. Clamping Portion |
| 16. Handle Bar | 17. Elastic Cord |
| 18. Hook | 19. Hole |
| 20. Hole | 21. Hole |
| 22. Hole | 23. Lid Retainer |
| 24. Upper Anchoring Pin | 25. Lower Anchoring Pin |
| 26. Cup | 27. Lid |

DETAILED DESCRIPTION OF THE INVENTION

Figure 1:
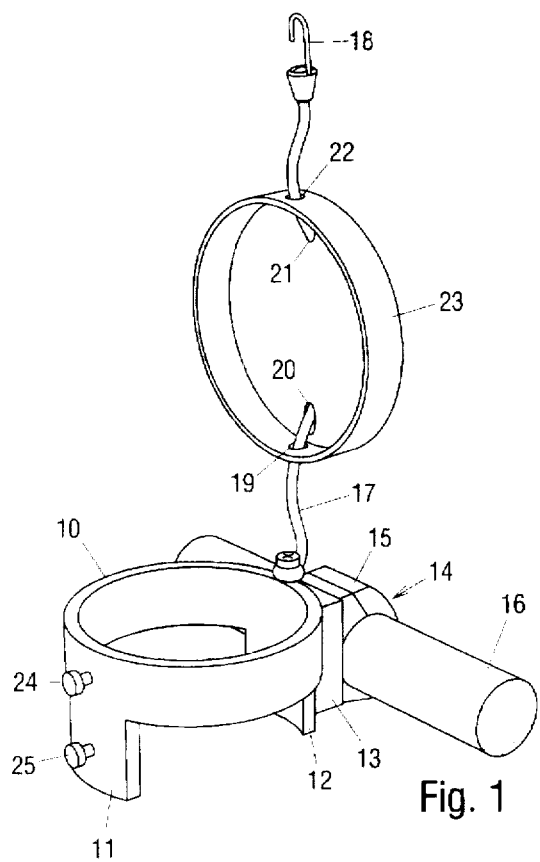
FIG. 1 is a side perspective view of a cup holder with lid retainer in accordance with a preferred embodiment of the invention.

In accordance with a preferred embodiment of the invention shown in the side perspective view of FIG. 1, a cup holder includes a ring-shaped supporting member 10 with a pair of vertical members 11 and 12 spaced at 180 degree intervals and projecting downwardly therefrom. Vertical member 12 is fixedly attached to a bracket portion 13 of a conventional mounting device 14, which also includes a clamping portion 15 for clamping onto a handlebar 16 of a bicycle (not shown). The proximal end of an elastic cord 17 is fixedly attached to supporting member 10. A hook 18 is attached to the distal end of cord 17. Cord 17 is slidably positioned through holes 19, 20, 21, and 22 arranged on a lid retainer 23. A pair of upper and lower anchoring pins 24 and 25 are arranged one above the other on the outside of vertical member 11. Bracket portion 13 is slidably and removably attached to clamping portion 15.

Figure 2:
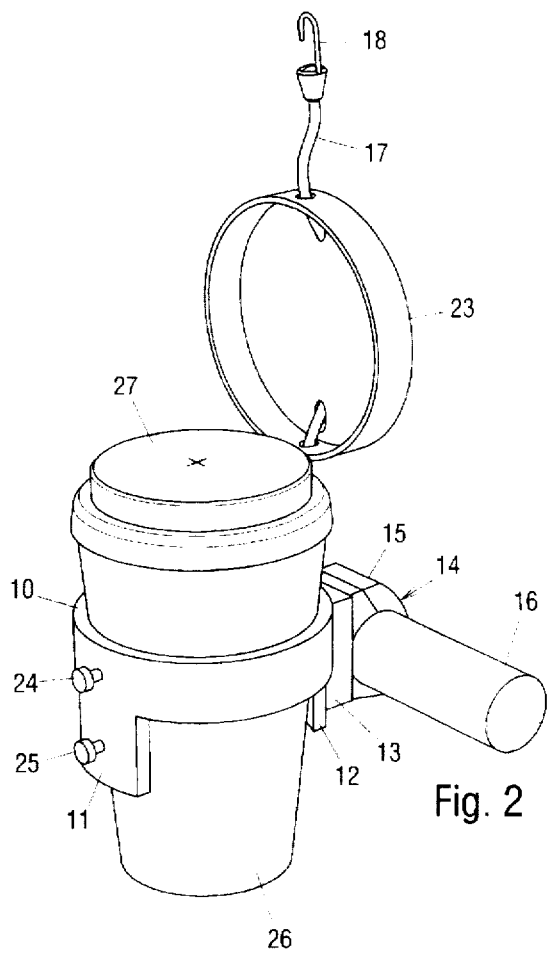
FIG. 2 is a side perspective view of the cup holder holding a cup.
Figure 3:
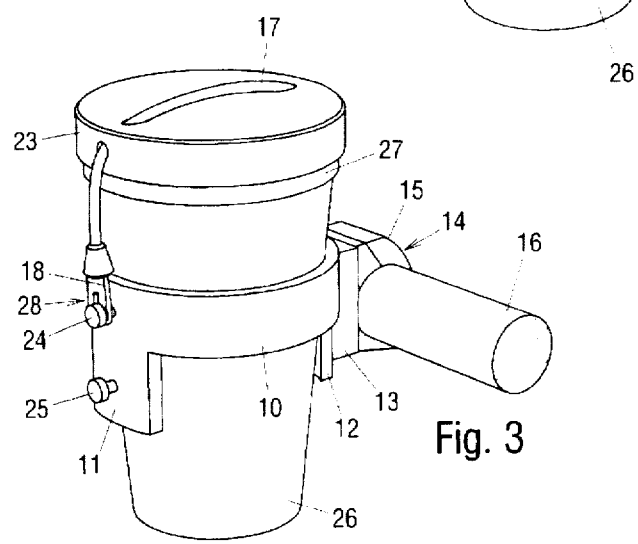
FIG. 3 is a side perspective view of the cup holder after the lid retainer is secured onto a lid of the cup.

Supporting member 10 is usable for holding a conventional, tapered disposable cup 26 with a conventional lid 27, as shown in FIG. 2. Supporting member 10 is sized for holding cups of various sizes. As shown in FIG. 3, lid 27 is secured on cup 26 by positioning lid retainer 23 directly on top thereof, stretching cord 17, and hooking hook 18 onto either pin 24 or 25, which is selected to maintain cord 17 in moderate tension. Upper anchoring pin 24 may be used for larger cups, and lower anchoring pin 25 may be used for smaller cups. Hook 18 and either pin 24 or 25 form the complimentary portions of a releasable attaching mechanism 28. Lid retainer 23 is lid-shaped, so that it will stay substantially centered over lid 27, and is sized to fit over the largest available lids. Thus secured, lid 27 is prevented from being forced off by the sloshing beverage during a bicycle ride. When it is not needed, the cup holder may be removed from the bicycle by sliding bracket portion 13 off clamping portion 15.

SUMMARY, RAMIFICATIONS AND SCOPE

Accordingly, I have provided a cup holder that securely holds a cup on a moving vehicle. It positively secures the lid of the cup to prevent spills even during a rough ride. It is easily attachable to a vehicle, and it is also easily removable when it is not needed.

Although the above descriptions are specific, they should not be considered as limitations on the scope of the invention, but only as examples of the embodiments. Many other ramifications and variations are possible within the teachings of the invention. For example, other types of mounting devices may be used for mounting the cup holder to bicycles or any other vehicle or structure. The lid retainer may be fixedly attached to the elastic cord instead of being slidably attached. The ring-shaped supporting member may have a closed bottom for supporting the bottom of a cup. Instead of being ring-shaped, the supporting member may be shaped differently, such as that shown in U.S. Pat. No. 4,948,080 to Jack. The cup holder may be built into new vehicles, in which case the mounting device may be eliminated. The hook and anchoring pins may be shaped differently, and other releasable attaching mechanisms may be used for anchoring the distal end of the cord, such as hook-and-loop fasteners. Both ends of the cord may be fixedly attached to the supporting member, so that the cord is stretched over the lid after the cup is positioned in the supporting member. Therefore, the scope of the invention should be determined by the appended claims and their legal equivalents, not by the examples given.

I claim:

1. A cup holder for holding a cup with a lid, comprising:

a ring-shaped supporting member with a top opening for receiving said cup, said supporting member having a completely open bottom for enabling a lower end of said cup to extend therethrough, so that said supporting member is adapted for receiving other cups of different sizes;

a lid retainer having a recessed lower surface for being securely positioned on said lid of said cup, said lid retainer including two pairs of spaced apart holes arranged adjacent opposite edges thereof and opening into said recessed lower surface; and an elongated elastic cord having a proximal end fixedly attached to said supporting member, said elastic cord having a distal end with a releasable attaching mechanism securing said distal end to said supporting member at a position directly across said opening from said proximal end of said elastic cord, said elastic cord positioned across an upper surface of said lid retainer at a medial position thereon, said elastic cord extending through said holes on said lid retainer so that said elastic cord is centered on said lid retainer, said elastic cord enabling said lid retainer to be positioned at varying distances above and parallel to said ring-shaped supporting member for retaining the lid on said cups of different sizes.

2. The cup holder of claim 1, further including a mounting device attached to said supporting member for mounting said cup holder to a vehicle.

* * * * *